United States Patent [19]

Downing

[11] 3,901,295

[45] Aug. 26, 1975

[54] TRIMMING APPARATUS

[75] Inventor: Verlan L. Downing, Bellevue, Wash.

[73] Assignee: Dart Industries Inc., Los Angeles, Calif.

[22] Filed: Oct. 15, 1974

[21] Appl. No.: 514,547

[52] U.S. Cl. ............... 144/118; 90/11 E; 90/19; 144/2 R; 144/134 A
[51] Int. Cl.² .................. B27C 1/02; B27C 5/04
[58] Field of Search ........... 144/2 R, 134 R, 134 A, 144/90 A, 236, 237, 218, 118, 116, 117, 117 B; 51/80; 90/11 E, 19

[56] References Cited
UNITED STATES PATENTS 2,563,655  8/1951  Martensson ................ 144/134 A
3,838,722  10/1974  Downing ....................... 144/118

*Primary Examiner*—Donald R. Schran
*Assistant Examiner*—W. D. Bray
*Attorney, Agent, or Firm*—Kenneth J. Hovet; Leigh B. Taylor; Paul R. Wylie

[57] ABSTRACT

Apparatus for trimming the side corner edges of a planar article such as wooden or particle board. The apparatus includes a pair of spaced rotary cutters adjustable to vary the distance between them to accommodate various thicknesses of articles to be trimmed, and a spring biasing member on one cutter to allow automatic movement of the cutter in the event that the article is warped or there are slight variations in the thickness of the edge being trimmed.

3 Claims, 11 Drawing Figures

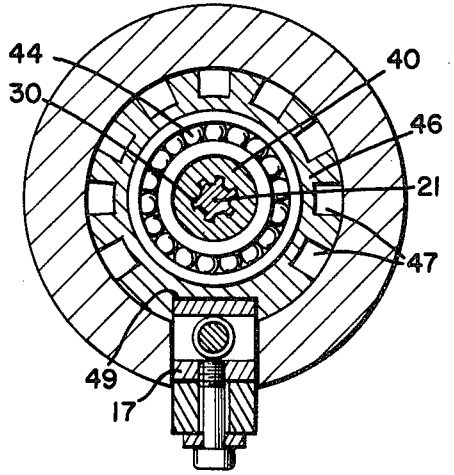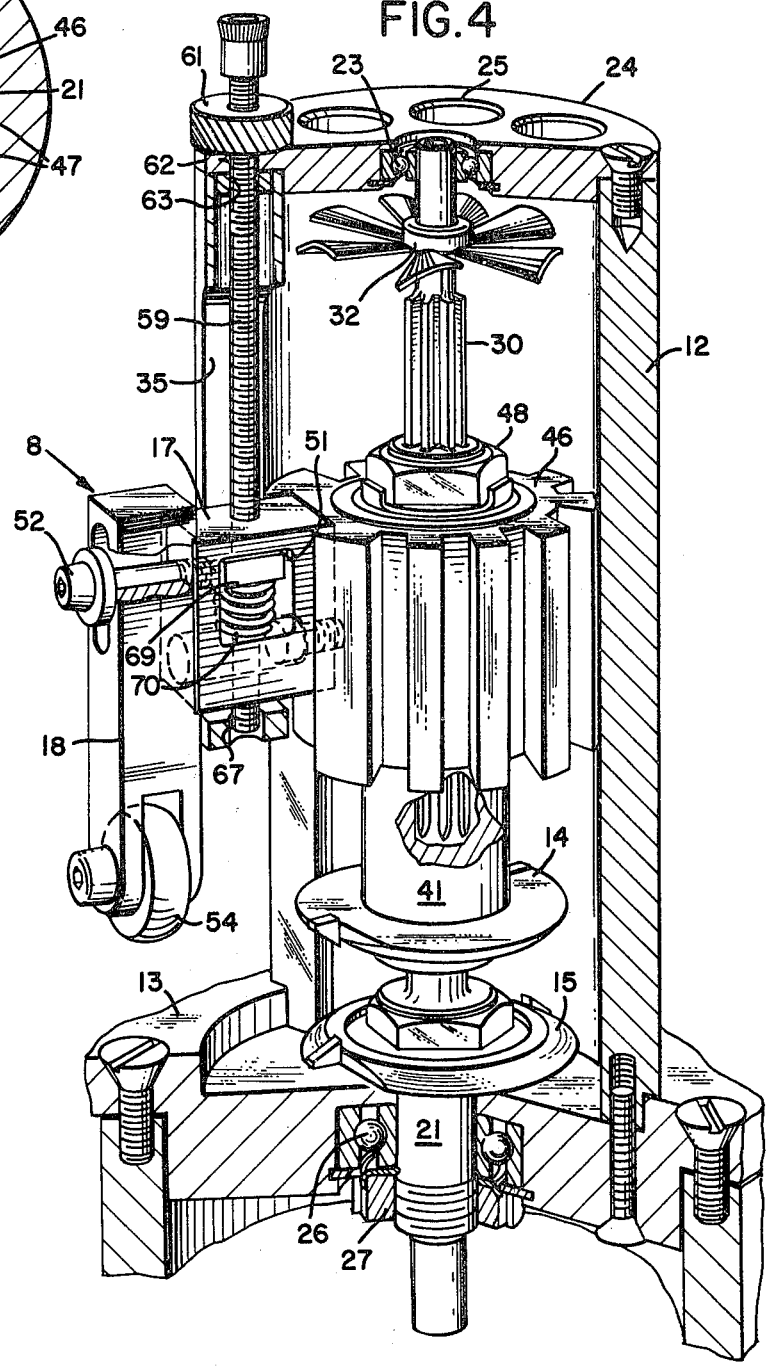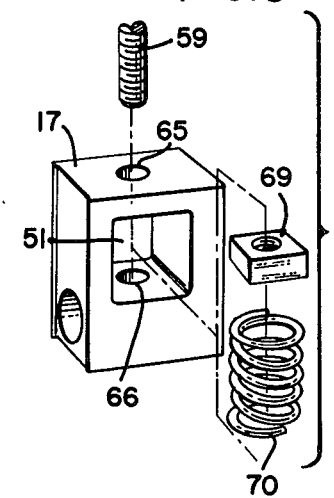

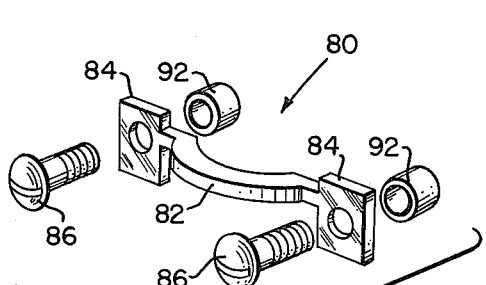
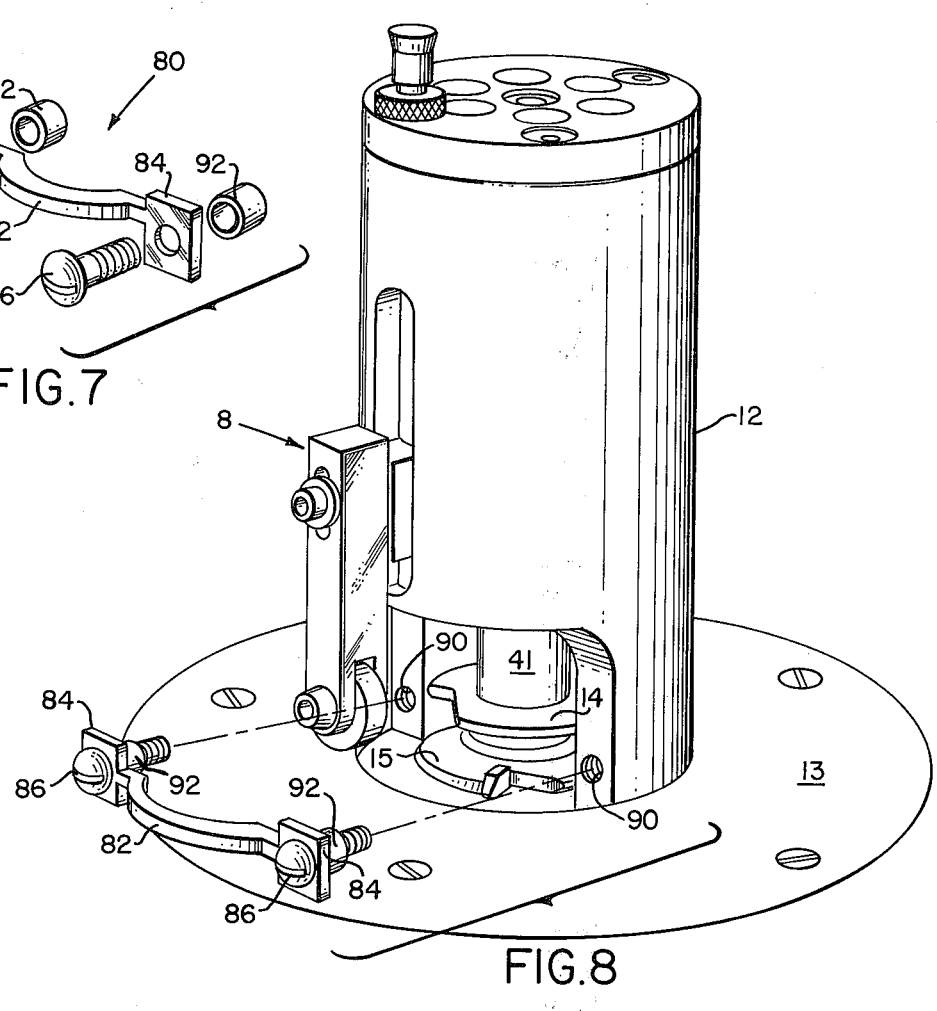
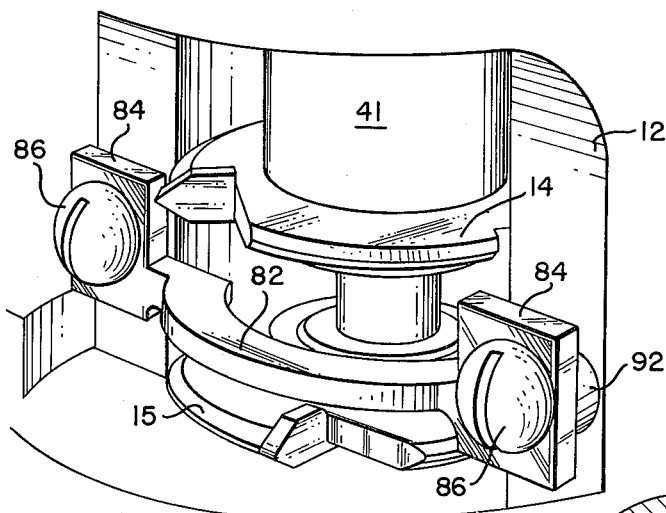
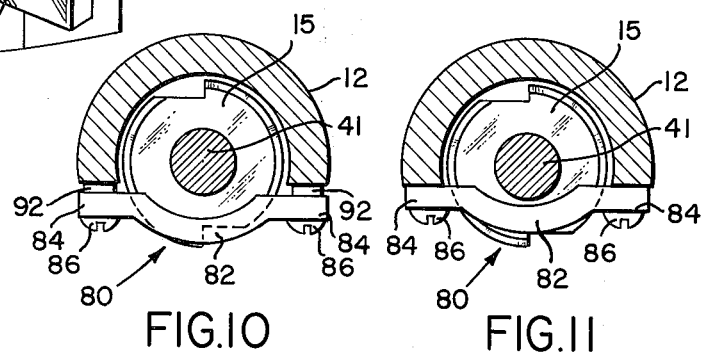

TRIMMING APPARATUS

BACKGROUND OF THE INVENTION

This invention relates to an apparatus for trimming panels of all types to remove the sharp edges along the sides thereof. Typically, the apparatus is used to trim woody products such as plywood, particle board, fiberboard, hardboard, lumber panels and decorative laminates such as a plastic wood grain sheet, vinyl, low and high pressure laminated sheet or the like. The finished panels are commonly used in the construction of cabinets, chests, doors, table tops, and shelves.

The edges of the panel contain sharp edges which should be removed prior to or after placing an edging tape on the panel. The edging tape normally matches the decorative qualities of the top of the board and is used to conceal the edge of the panel. A description of such panel is contained in U.S. Pat. No. 3,011,932 to Downing.

Normally the edges of the panel are finished with a conventional routing maching which has a rotary cutter to trim the edge. Some machines are known that simultaneously trim the upper and lower edge of the board. One of the major deficiencies of the known machines is the high level of noise generated during operation of the machines. The prior art machines also lack the degree of preciseness of control of the present invention and the unique structural arrangement of the present invention that compensates for variations in the edge of the board being trimmed.

U.S. Pat. No. 1,030,295 illustrates a prior art machine for leveling the edges of boards used for manufacturing boxes. U.S. Pat. No. 1,630,173 shows cutters which are spring biased toward each other.

SUMMARY OF THE INVENTION

A major objective of the present invention is to produce a trimming machine having great durability while maintaining a cost of manufacture which is relatively low. To reduce operating noise and durability, it is desirable to support the shaft, which is driving the cutters, at a plurality of points along the shaft. Thus, it became necessary to devise a unique adjusting mechanism to permit adjustment of the cutters relative to each other to accommodate various thicknesses of boards being trimmed. Also it is necessary to develop a unique biasing arrangement to permit slight movements in the cutting blades relative to each other to accomodate warpage or variations in the boards being trimmed. The adjusting mechanism must function rapidly to avoid downtime in the production line and must be a positive adjustment so that once the blades have been adjusted relative to each other, the adjustment will not change and the blades will maintain their position relative to each other for consistent production of trimmed boards. Also, the biasing arrangement must function unerringly to avoid faulty production of trimmed boards.

In general, prior art trimming machines must operate at a very high speed (20,000 RPM and upwards). This is because of production line demands and the desirability of providing a clean cut with smooth edges on the trimmed board. However, the machine of the present invention operates at a low 10,000 RPM and accomplishes clean cuttings at a much lower sound level. This is due to the unique coupling between the electric motor and the trimmer means and the rigidity thereof due to the drive shaft being supported by discretely placed ball bearings.

DESCRIPTION OF THE DRAWINGS

FIG. 3 is a cross-section taken on line 3—3 of FIG. 2;

FIG. 4 is a fragmentary sectional perspective view of the upper portion of the trimming machine;

FIG. 5 is a perspective view of one of the cutting blades;

FIG. 6 is an exploded perspective view of the spring biased adjustment block assembly;

FIG. 7 is an exploded perspective view showing a contour guide in accordance with a modification of the present invention;

FIG. 8 is an assembled perspective view of the contour guide of FIG. 7 in exploded relation to the trimming machine of FIG. 1;

FIG. 9 is a broken-away enlarged scale perspective view of the contour guide and trimming machine shown in FIG. 8 with the contour guide assembled with the trimming machine;

FIG. 10 is a plan view of the contour guide of FIG. 9 showing its relationship with the trimming machine; and, FIG. 11 is a plan view of a modified assembly of the contour guide and cutting blade shown in FIG. 10.

DESCRIPTION OF THE INVENTION

Figure 1:
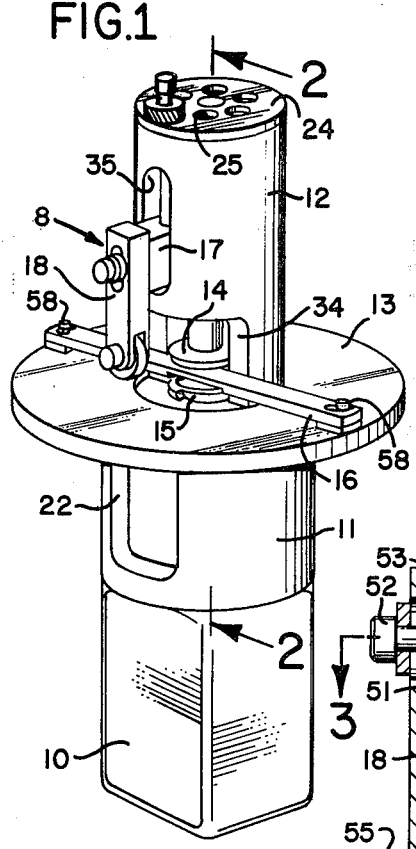
FIG. 1 is a perspective view of the trimming machine of the present invention.

FIG. 1 illustrates the trimmer unit which includes a bottom motor 10, a bottom housing 11, an upper housing 12, a table 13, upper cutting blade 14, lower cutting blade 15, guide bar 16, adjustment means 8, and holddown bar and roller 18.

The motor 10 is a conventional ½ HP motor having a speed of about 10,000 RPM. The drive shaft 19 extending from the motor is attached by a conventional coupling 20 to the lower end of shaft 21 to rotate the shaft about its longitudinal axis. The housing 11 is preferably circular and mounted on the top of the motor. The housing 11 has openings 22 to provide access to the coupling 20.

Figure 2:
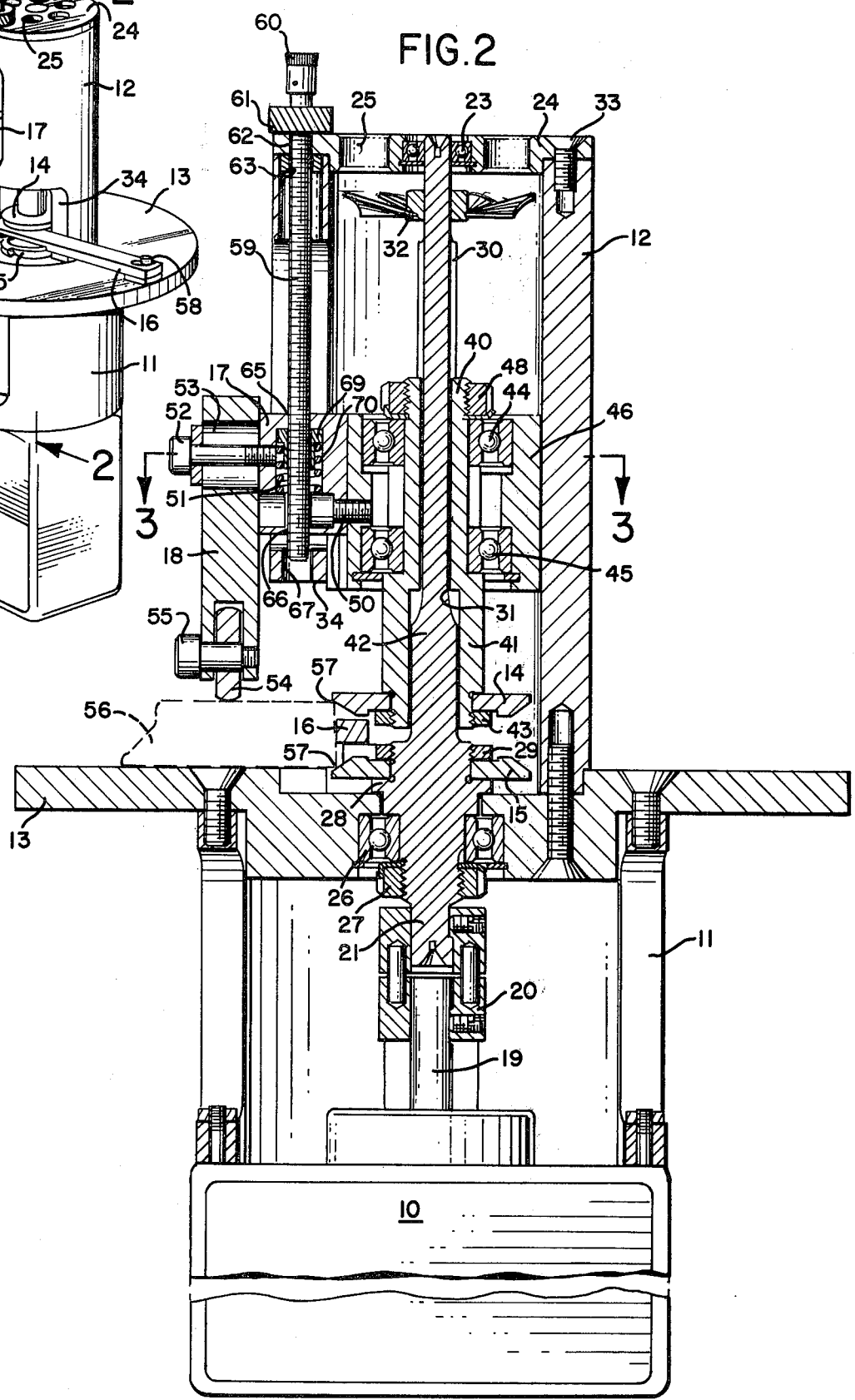
FIG. 2 is a cross-section taken on line 2—2 of FIG. 1.

As shown in FIG. 2, the shaft 21 extends vertically and is journaled at its upper end in bearing 23 which is mounted in a top plate 24. The top plate 24 has openings 25 therein for the purpose of cooling the apparatus during operation.

The shaft 21 is also rotatably mounted in bearings 26 which are seated in table 13. A lock nut 27 seats the bearings 26 in proper position within a recess underside of the table 13.

An integral shoulder 28 on the shaft 21 is located immediately above the table 13 and forms the under support for bottom cutting blade 15. A lock nut 29 is threaded on the shaft 21 and locks the cutting blade 15 to the shaft 21 so that blade 15 rotates in unison with shaft 21.

The shaft 21 has splines 30 extending from near its upper end to a point indicated by numeral 31.

A fan 32 is mounted on the under end of the shaft and is rotatable in unison with the shaft 21 to force air through the apparatus during operation to cool the parts and particularly the bearing 23 and the other bearings to be hereinafter described. Also the fan operates to blow cuttings away from the work area.

The housing 12 is closed at its upper end by orificed cover plate 24 which is affixed thereto by bolts 33. The housing 12 is preferably tubular in form and has a lower cut-out portion 34 which exposes the cutting blades 14 and 15. A second cut-out portion 35 is provided to accommodate the adjusting mechanism 8.

A sleeve 40 is positioned on the upper end of the shaft 21 and has complimentary slots therein to slidably receive the splines 30, as shown in FIG. 3. The sleeve 40 has an enlarged lower portion 41 which is slidably received on a portion 42 of the shaft 21. The sleeve 40 is slidable vertically on the shaft 21 along the splines 30. The enlarged portion 41 of the sleeve has a recessed lower end which receives the upper cutting blade 14 and a threaded portion which receives a lock nut 43 to maintain the cutting blade 14 in locked nonmovable position. Thus, upon rotation of the shaft 21 the sleeve 40 will be rotated in unison with the shaft 21 and the cutting blade 14 rotates in unison with the sleeve 40. A pair of conventional ballbearings 44 and 45 are positioned around the sleeve 40 and are supported in a mounting block 46. The mounting block 46 has outer peripheral openings 47 which permit air to be forced through the apparatus during operation of the fan 32. A lock nut 48 is threadably received on the upper end of sleeve 40 to lock the bearings 44, 45 within the mounting block 46. The mounting block 46 is vertically slidable within the housing 12. The front face of the mounting block 46 has a large recess 49 which receives the adjustment block 17, which is affixed to the mounting block 46 by a bolt 50. The adjustment block 17 has an internal chamber 51, the function of which will be described hereinafter.

The hold-down arm 18 is affixed to the outer face of the adjustment block 17 by a bolt 52 passing through a slot 53 in the arm 18. Thus, the arm 18 may be adjusted vertically by loosening the bolt 52 and moving the arm 18 upward or downward within the slot 53.

The lower end of hold-down arm 18 has a roller 54 rotatably mounted on an axis bolt 55. The position of roller 54 is adjusted to engage the top of the board 56 as it is fed through the apparatus and against the cutting blades 14 and 15.

The guide bar 16 passes across the table 13 and between cutting blades 14 and 15 in the manner shown in FIG. 2. Thus, the inner end of the board 56 being trimmed is engaged against the guide plate 16 in the manner shown in FIG. 2 to permit trimming of the edges 57. The guide bar 16 is adjustable inwardly and outwardly (left or right, respectively, in FIG. 2) of the cutting blades 14 and 15 to permit a smaller or greater cut being made by the cutting blades in trimming the corners 57. The adjustment of the guide bar 16 is accomplished by a slot at each end of the guide bar 16. Hold-down bolts 58 on each end of the guide bar can be loosened and the guide bar 16 moved inwardly or outwardly of the cutting blades 14 and 15.

Referring now to FIGS. 4 and 6, the adjusting mechanism includes a threaded bolt 59 having an integral knurled head 60. A locking nut 61 is threaded on bolt 59. The threaded bolt 59 passes through an unthreaded opening 62 in the top plate 24 and through a set ring 63 immediately above opening 35. The set ring is secured to bolt 59 and is located thereon to abut plate 24.

Bolt 59 extends into the opening 35 and through an unthreaded top opening 65 and an unthreaded bottom opening 66 in adjustment block 17. The bottom end of bolt 59 is positioned in an unthreaded hole 67 in housing 12 immediately below opening 35.

A sleeve 69 is threaded onto bolt 59 and located within chamber 51 of adjustment block 17. Sleeve 69 is slidable vertically in chamber 51 but non-rotatable within the chamber.

A compression spring 70 abuts the bottom of sleeve 69 and maintains it in an upper position against the top of chamber 51.

The adjustment block 17 is slidable vertically in the opening 35 of housing 12.

Thus, as bolt 59 is rotated, the adjustment block 17 will be moved vertically by threaded sleeve 69 to vary the distance between cutting blades 14 and 15. Hold-down roller 54 will also be moved vertically in coordination with the movement of top cutting blade 14. Once the block is located at the desired level, lock nut 61 can be tightened against plate 24 for securing the bolt 59 thereto.

When the top cutting blade 14 engages uneven edge portions of the panel being trimmed, the blade can move upward or downward to accommodate this portion of the panel by compressing or allowing expansion in the spring 70. It should also be noted that the hold-down roller 54 may engage a raised or lowered portion of the panel which will result in the roller following the contour of the panel and thereby correspondingly raising or lowering the top cutting blade 14.

The above-described features of the trimming machine result in a more uniform trimming of the edges 57 of the panel 56. However, to achieve this desirable result, it is preferable that the hold-down roller be reasonably close to the cutting blade 14, and ideally the roller should not be a distance from the cutting blade exceeding about two thicknesses of the panel being trimmed.

Although the amount of material trimmed from the corners 57 of the panel 56 can vary, the preferred amount of trim is between 1/64 and 1/32 inches measured at a 25° angle from the flat top of the panel.

The present trimming machine can be effectively used to trim panel edges which are not straight but rather curved such as round table tops. If the panel being trimmed is of a very unusual configuration, such as an S shape, then appropriate modification of guide bar 16 must be made.

FIGS. 7–11 illustrate a modification of the invention specifically adapted for trimming curved panel edges. The modification comprises a curved guide means shown generally by reference numeral 80 which is used in place of guide bar 16 as an abutment for the curved panel edges. The guide means includes a curvilinear bar portion 82 having integral flat opposite end portions 84. The end portions are provided with fastening means for securing the guide means to machine housing 12. In the embodiments shown, the fastening means comprises threaded bolts 86 adapted to extend through orifices 88 of end portions 84 and engage the female threads of housing openings 90. The openings are preferably located to position the guide means about vertically equidistant from each of the cutting blades 14, 15 and extend radially from the axis of said blades a distance proximate the outer blade edges.

The guide means 80 shown in FIGS. 7–10 include spacer members 92 which are inserted over bolts 86 and between the housing 12 and end portions 84. The spacer members are of a predetermined thickness and operate to laterally offset the convex-shaped bar portion 82 from the outer periphery of cutting blades 14, 15. FIG. 10 illustrates a relatively small portion of the blade 15 extending laterally beyond bar portion 82 thereby effecting a relatively light trim cut. FIG. 11 illustrates the guide means secured to the housing without spacer members 92. In this instance, a larger portion of blade 15 extends radially beyond bar 82 so as to produce a heavier trim cut. Of course, the thickness of the spacer members can be varied to produce whatever degree of cut is desired.

FIG. 5 illustrates a preferred trimming blade 15 for use in the present invention. The blade is substantially disc shaped and includes peripheral edge portions 72 which are beveled in accordance with the desired angle of trim. Spaced about the circumference of the edge portions are cutting notches 74. It is to be understood that blade 14 is a mirror image of the blade 15 shown in FIG. 5.

The described trimming machine is preferably operated by mounting it vertically (although it can be mounted horizontally), a panel is placed on table 13 with the edge to be trimmed in engagement with guide bar 16. Then the panel is pushed through the trimming machine between the cutting blades 14 and 15 with the edge to be trimmed in engagement with bar 16.

The present invention is simple in operation, rugged and quiet in operation. The adjustment mechanism is positive in action and accommodates variations in the panels being trimmed.

The spring 70 must be sufficiently stiff (K factor) to resist any tendency of the cutting blade 14 to push up and thus not perform a consistent cutting operation, and it must be sufficiently resilient to allow movement of the blade upwardly in the event of warpage or the like in the panel being trimmed.

While I have described a preferred embodiment of my invention, it may be otherwise embodied to perform the desired functions as will be apparent to those skilled in the art.

I claim:

1. A machine for trimming the edges of a planar product having curved edges, said machine having a pair of spaced-apart spring biased rotary cutting blades located within a housing and positioned adjacent a table, wherein the improvement comprises guide means located adjacent said cutting blades above said table, said guide means including a convex-shaped bar portion extending radially from the axis of said blades a distance proximate the peripheral edges of said blades and about vertically equidistant therefrom, said bar portion having integral flat opposite end portions including fastening means for securing said guide means to said machine to provide an abutment for trimming the planar product.

2. The machine of claim 1 wherein the housing of said machine is provided with internally threaded openings and said fastening means comprises threaded bolt means adapted to threadingly engage said housing openings.

3. The machine of claim 2 wherein said fastening means includes removable spacer members for insertion over the threaded bolt means to vary the radial distance said bar portion extends relative to the peripheral edges of said cutting blades.

* * * * *